(12) United States Patent
Khare et al.

(10) Patent No.: US 8,184,887 B2
(45) Date of Patent: May 22, 2012

(54) SYSTEM AND METHOD FOR IMAGE RECONSTRUCTION

(75) Inventors: Kedar Bhalchandra Khare, Schenectady, NY (US); Bruno Kristiaan Bernard De Man, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 873 days.

(21) Appl. No.: 12/200,946

(22) Filed: Aug. 29, 2008

(65) Prior Publication Data

US 2010/0054561 A1 Mar. 4, 2010

(51) Int. Cl.
*G06K 9/00* (2006.01)

(52) U.S. Cl. ............... 382/131; 382/128; 378/4; 378/57

(58) Field of Classification Search .................. 382/128, 382/131; 378/4, 57
See application file for complete search history.

(56) References Cited

U.S. PATENT DOCUMENTS

| | | | | |
|---|---|---|---|---|
| 4,709,333 | A * | 11/1987 | Crawford | 600/425 |
| 5,744,802 | A | 4/1998 | Muehllehner et al. | |
| 6,002,738 | A * | 12/1999 | Cabral et al. | 378/4 |
| 6,094,467 | A * | 7/2000 | Gayer et al. | 378/4 |
| 6,351,548 | B1 * | 2/2002 | Basu et al. | 382/128 |
| 6,510,241 | B1 * | 1/2003 | Vaillant et al. | 382/154 |
| 6,771,732 | B2 | 8/2004 | Xiao et al. | |
| 7,215,731 | B1 * | 5/2007 | Basu et al. | 378/4 |
| 7,254,209 | B2 | 8/2007 | Zhao et al. | |
| 2005/0123089 | A1 * | 6/2005 | Man | 378/4 |
| 2005/0123215 | A1 * | 6/2005 | Man | 382/275 |
| 2006/0002504 | A1 | 1/2006 | De Man et al. | |
| 2006/0204065 | A1 * | 9/2006 | Hsieh et al. | 382/128 |
| 2006/0257010 | A1 | 11/2006 | George et al. | |

OTHER PUBLICATIONS

Miles N. Wernick, E. James Infusino and Milos Milosevic; "Fast Spatio-Temporal Image Reconstruction for Dynamic PET"; Publication Date: Mar. 1999, vol. 18, Issue: 3 on pp. 185-195, ISSN: 0278-0062, References Cited: 20, CODEN: ITMID4 INSPEC Accession No. 6271331, Date Published in Issue: 2002-08-06 22:28:46.0.

Patrick J. La Riviere; "Monotonic Iterative Reconstruction Algorithms for Targeted Reconstruction in Emission and Transmission Computed Tomography"; 2006 IEEE Nuclear Science Symposium Conference Record; pp. 2924-2928(5 pages).

B. De Man, P.M. Edic and S. Baso; "An Iterative Algorithm for Time Resolved Reconstruction of a CT Scan of a Beating Heart"; 4 Pages. 2005.

Charles W. Stearns, Ravindra M. Manjeshwar, Scott D. Wollenweber; "An Efficient Algorithm for Targeted Reconstruction of Tomographic Data"; pp. 2808-2811(4 pages). 2006.

John Nuyts, Bruno De Man, Patrick Dupont, Michael Defrise, Paul Suetens and Luc Mortelmans; "Iterative Reconstruction for Helical CT: A Simulation Study"; Print publication: Issue 4 (Apr. 1998), Received Jul. 31, 1997; John Nuyts et al 1998 Phys. Med. Biol. 43 729-737.

* cited by examiner

*Primary Examiner* — Alexander H Taningco
(74) *Attorney, Agent, or Firm* — Jason K. Klindtworth

(57) ABSTRACT

A tomographic imaging apparatus is provided for generating images. The tomographic apparatus includes a computer programmed to access a data sinogram representative of the image, reconstruct the image, divide the image into a plurality of sub-regions, define a region of interest including at least one sub-region, reprojecting a region of interest or a complement of the region of interest to generate a region of interest sinogram or a sinogram representative of the complement of the region of interest and reconstructing a resultant sinogram using iterative methods to generate an image.

13 Claims, 5 Drawing Sheets

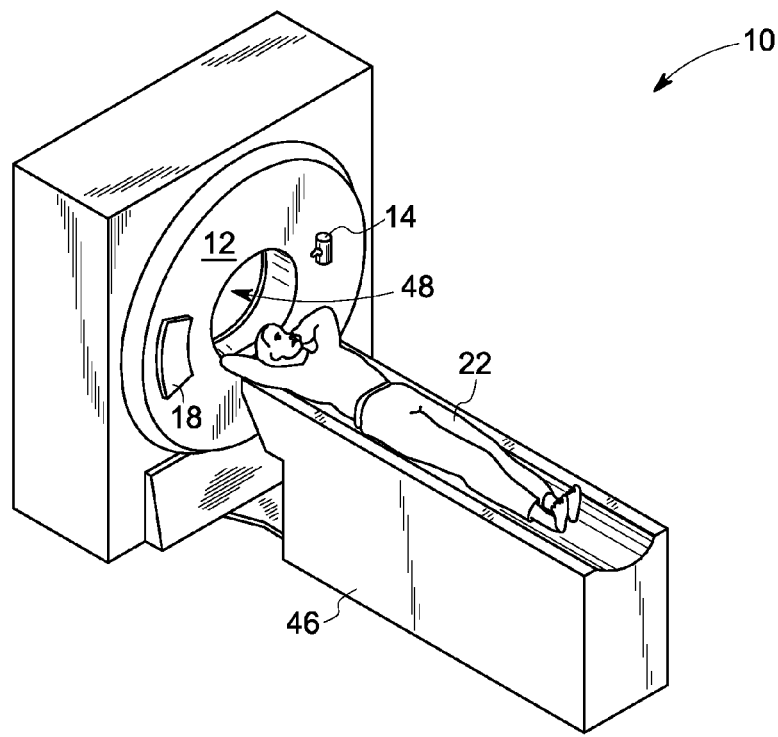
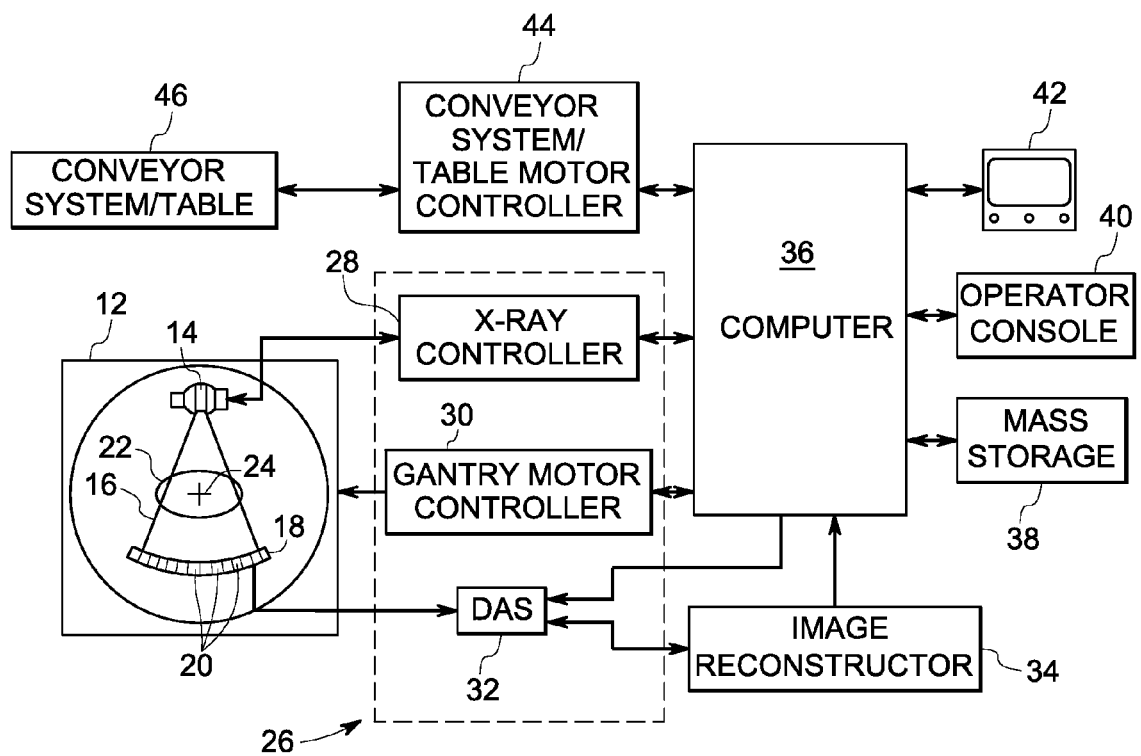
FIG. 1
FIG. 2

SYSTEM AND METHOD FOR IMAGE RECONSTRUCTION

BACKGROUND

Embodiments of the invention generally relate to imaging and more particularly, to a technique for sinogram separation and targeted reconstruction.

Non-invasive imaging broadly encompasses techniques for generating images of the internal structures or regions of a person or object that are otherwise inaccessible for visual inspection. One of the best-known uses of non-invasive imaging is in the medical arts where these techniques are used to generate images of organs and/or bones inside a patient which would otherwise not be visible. Other well-known uses are in the field of non-destructive testing, such as for security and package screening or for quality control of manufacturing processes. Example of such non-invasive imaging modalities include X-ray based techniques, such as computed tomography (CT), as well as nuclear-based techniques, such as position emission tomography (PET) and single photon emission computed tomography (SPECT). With regard to CT imaging techniques, CT scanners typically operate by projecting fan shaped or cone shaped X-rays from an X-ray source. The X-ray source emits X-rays at numerous angles relative to an object being imaged, such as a patient, which attenuates the X-rays as they pass through. The attenuated X-rays are detected by a set of detector elements, which produce signals representing the attenuation of the incident X-rays. The signals are processed and reconstruction algorithms are employed to form images which may be evaluated themselves or which may be associated to form a volume rendering or other representation of the imaged region. In a medical context, pathologies or other structures of interest may then be located or identified from the reconstructed images or rendered volume.

CT reconstruction is usually performed using direct reconstruction techniques like the Filtered back projection (FBP) technique, based on mathematical ideals that are not typically observed in practice. One side effect of the failure of the mathematical ideals to correspond to the actual practice is that noise and resolution performance is not optimized using direct reconstruction techniques. Although these types of techniques can be performed very fast they tend to amplify the noise on the data, thereby degrading the image quality.

Iterative reconstruction techniques overcome these problems by employing various mathematical models, such as noise and system models, to account for deviations from the mathematical ideals. Iterative reconstruction techniques repeatedly apply respective forward and backward projection models to generate an image that best fits the image measurements according to an appropriate objective function. In this manner, iterative reconstruction algorithms may provide improved image quality and/or reduced X-ray dosage. In addition, iterative reconstruction algorithms may provide other benefits, such as reduction of metal artifacts in reconstructed images.

However, iterative reconstruction algorithms require significantly more computational time than conventional (direct) reconstruction methods and have thus far been impractical for mainstream CT applications. In particular, iterative reconstruction algorithms undergo many iterations to generate each image, in order to converge. Further, each iteration employs two or more computationally intensive projection and back-projection operations. As a result, iterative reconstruction algorithms may require at least an order of magnitude or more computational effort than a direct reconstruction technique to construct a single image. Consequently, iterative reconstruction approaches are typically much slower than comparable direct reconstruction approaches. It is therefore desirable to reduce the computational effort in the projection and backprojection operations.

BRIEF DESCRIPTION

Briefly in accordance with one aspect of the technique a method is provided for generating an image. The method provides for accessing a data sinogram representative of the image, reconstructing the image, dividing the image into a plurality of sub-regions, defining a region of interest including at least one sub-region, reprojecting a region of interest or a complement of the region of interest to generate a region of interest sinogram or a sinogram representative of the complement of the region of interest and reconstructing a resultant sinogram using iterative methods to generate an image. Systems and computer programs that afford functionality of the type defined by this method may be provided by the present technique.

In accordance with another aspect of the technique, a method is provided for accessing a data sinogram representative of the image, reconstructing the image, dividing the image into plurality of sub-regions, defining a region of interest including at least one sub-region, reprojecting a complement of the region of interest to generate a sinogram representative of the complement of the region of interest, identifying an estimated representation of the region of interest, reprojecting the estimated representation of the region of interest to obtain an estimated sinogram, adding the estimated sinogram with the sinogram representative of the complement of the region of interest to obtain a resultant sinogram, comparing the resultant sinogram with the data sinogram to determine if a similarity threshold has been satisfied and iteratively updating the estimated representation of region of interest if the similarity threshold is not satisfied. Here again, systems and computer programs that afford such functionality may be provided by the present technique.

In accordance with additional aspect of the present technique a tomographic imaging apparatus is provided. The tomographic apparatus includes a computer programmed to access a data sinogram representative of the image, reconstruct the image, divide the image into a plurality of sub-regions, define a region of interest including at least one sub-region, reproject the region of interest or a complement of the region of interest to generate a sinogram representative of the region of interest or a sinogram representative of the complement of the region of interest, and reconstruct a resultant sinogram using iterative methods to generate an image. The tomographic imaging apparatus further comprises a display for displaying the image.

In accordance with yet another aspect of the present technique a tomographic imaging apparatus is provided. The tomographic apparatus includes a computer which is programmed to access a data sinogram representative of the image; reconstruct the image, divide the image into plurality of sub-regions, define a region of interest including at least one sub-region, reproject the complement of region of interest to generate a sinogram representative of the complement of the region of interest, identify an estimated representation of the region of interest, reproject the estimated representation of the region of interest to obtain an estimated sinogram, add the estimated sinogram with the sinogram representative of the complement of the region of interest obtain a resultant sinogram, compare the resultant sinogram with the data sinogram to determine if a similarity threshold has been satisfied and iteratively update the estimated representation of region of interest if the similarity threshold is not satisfied. The tomographic imaging apparatus further comprises a display for displaying the image.

DRAWINGS

These and other features, aspects, and advantages of the present invention will become better understood when the following detailed description is read with reference to the accompanying drawings in which like characters represent like parts throughout the drawings, wherein:

FIG. 1 is a pictorial view of a CT imaging system;

FIG. 2 is a block schematic diagram of the system illustrated in FIG. 1;

DETAILED DESCRIPTION

Figure 3:
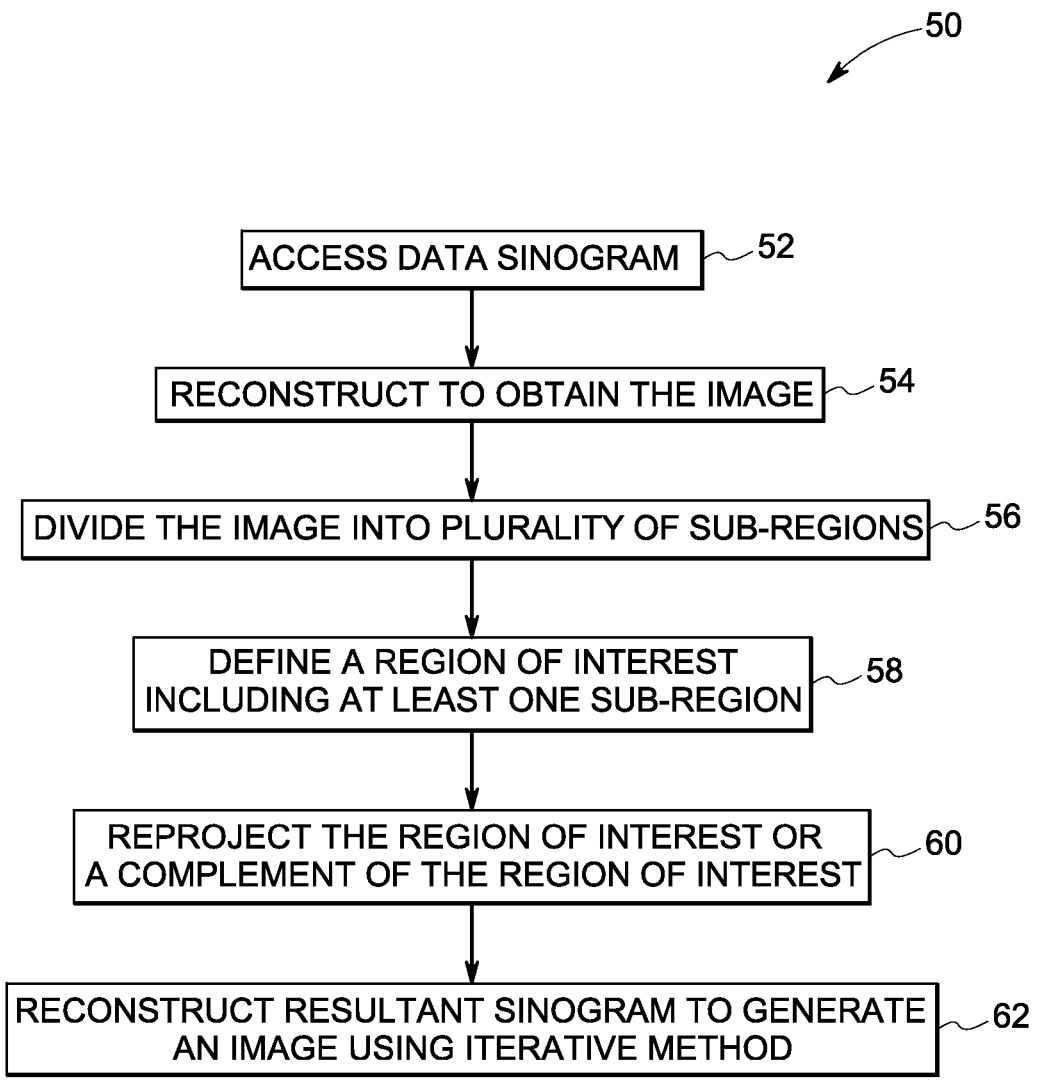
FIG. 3 is a flowchart depicting a process according to one aspect of the present invention.

Embodiments of the present invention are generally directed to imaging techniques employing iterative filtered backprojection for sinogram separation and targeted reconstruction. Though the present discussion provides examples in context of medical imaging systems and CT systems in particular, the application of these techniques in other contexts, such as for industrial imaging, security screening, and or baggage or package inspection, is well within the scope of the present techniques.

Referring now to FIGS. 1 and 2, a computed tomography (CT) imaging system 10 is shown as including a gantry 12 representative of a "third generation" CT scanner. Gantry 12 has an x-ray source 14 that projects a beam of x-rays 16 towards a detector array 18 on the opposite side of gantry 12. Detector array 18 is formed by a plurality of detectors 20 which together sense the projected x-rays that pass through an object to be imaged, such as a medical patient 22. During a scan to acquire x-ray projection data, gantry 12 and the components mounted thereon rotate about a center of rotation 24. While the CT imaging system 10 is shown in reference to a medical patient 22, it should be appreciated that such imaging system 10 may have applications outside the medical realm. For example, the CT imaging system 10 may be utilized in a luggage screening capacity, for ascertaining the contents of closed articles, such as luggage, packages, etc., and in search of contraband such as explosives or biohazardous materials. Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from detectors 20 and converts the data to digital signals for subsequent processing. An image reconstructor 34 receives sampled and digitized x-ray data from DAS 32 and performs high-speed reconstruction. The reconstructed image is applied as an input to a computer 36, which stores the image in a mass storage device 38.

Computer 36 also receives commands and scanning parameters from an operator via console 40 that has an input device such as a keyboard. An associated cathode ray tube display 42 allows the operator to observe the reconstructed image and other data from computer 36. The commands and parameters supplied by the operator are used by computer 36 to provide control and signal information to DAS 32, x-ray controller 28 and gantry motor controller 30. In addition, computer 36 operates a table motor controller 44, which controls a motorized table 46 to position a patient 22 and gantry 12. Particularly, table 46 moves portions of patient 22 through a gantry opening 48.

As described, the imaging apparatus acquires data from an object and sends the acquired raw data to a receiver. The data is processed in a post processor, which performs a variety of post-processing functions such as rebinning and filtering. The output of the post-processor is typically a sinogram that is then backprojected to reconstruct an image that can be displayed. It is contemplated that the backprojection and reprojection techniques can be embodied in computer executable code that can be executed by computer 36 or other processor. A sinogram may be defined as an image representation of raw data obtained when projection-reprojection imaging is used.

According to an embodiment of the present technique a data sinogram representative of an image may be accessed. Such data sinogram may be retrieved from a memory or a data storage device. Alternatively the data sinogram may be accessed from the imaging system as described in FIG. 1 and FIG. 2. Next, image reconstruction may be performed on the data sinogram to generate an image. In one embodiment, iterative filtered backprojection is performed with one or more iterations on the data sinogram to obtain a reconstructed image that may be noisy in appearance. As will be appreciated, a boosting kernel may further be employed to reduce the number of iterations used to generate the reconstructed image. Here "noise" implies random, usually unwanted fluctuations of pixel values in an image. Although the image may be filled with "noise" it is generally representative of the data sinogram. According to one embodiment of the present technique, other iterative reconstruction techniques in addition to or in place of the filtered backprojection may be performed to obtain the image representative of data sinogram. The obtained image may be further divided into a number of blocks or sub-regions. For example the image may be divided into N×M blocks or sub-regions. According to one embodiment, the sub-regions may take a variety of shapes and forms such as squares and hexagons. A hexagonal shaped sub-region may be preferred because hexagonal regions provide a better approximation of a circle and can also be stacked well to fill the full field-of-view. The one or more individual blocks or sub-regions, representative of a region of interest or the complement of the region of interest may then be reprojected to obtain a partial sinogram that represents the contribution of image blocks to the full sinogram data. Here, the complement of region of interest represents all the pixels in the image that are not included in the region of interest, such that, the sum of the region of interest image and the complement image gives the full field-of-view image. Further, a statistical reconstruction technique may be used with each of the partial sinograms to reconstruct the corresponding image blocks. As will be appreciated, a variety of statistical reconstruction methods may be used, such as the maximum-likelihood, maximum-a-posteriori, weighted least squares and penalized weighted least squares.

According to one embodiment of the present technique, a resultant sinogram may be obtained by subtracting the sinogram representative of the complement of the region of interest from the data sinogram. The resultant sinogram thus obtained may be reconstructed using a variety of methods such as the maximum-likelihood, maximum-a-posteriori, weighted least squares and penalized weighted least squares to generate an image for the region of interest.

FIG. 3 is a flowchart illustrating a control scheme 50 for generating an image in accordance with an embodiment of the invention. In the illustrated embodiment, the control scheme 50 includes the steps of accessing a data sinogram at step 52, reconstructing the data sinogram to obtain the image at step 54, dividing the image into a plurality of sub-regions at step 56, defining a region of interest by including at least one sub-region at step 58, reprojecting the region of interest or a complement of the region of interest at step 60 and reconstructing the resultant sinogram using iterative methods to generate an image at step 62.

Figure 4:
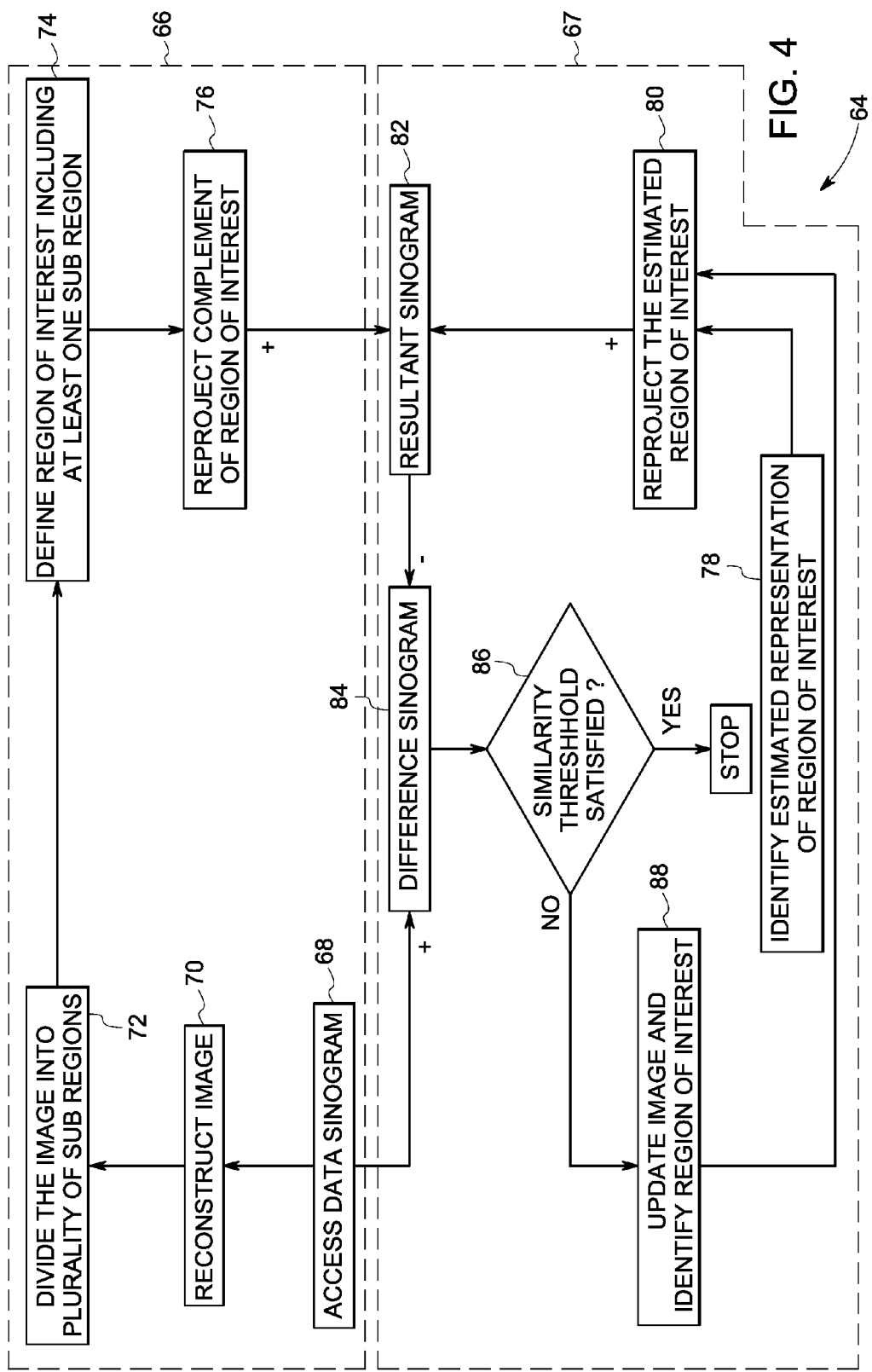
FIG. 4 is a flowchart depicting a process according to another aspect of the present invention.
Figure 5:
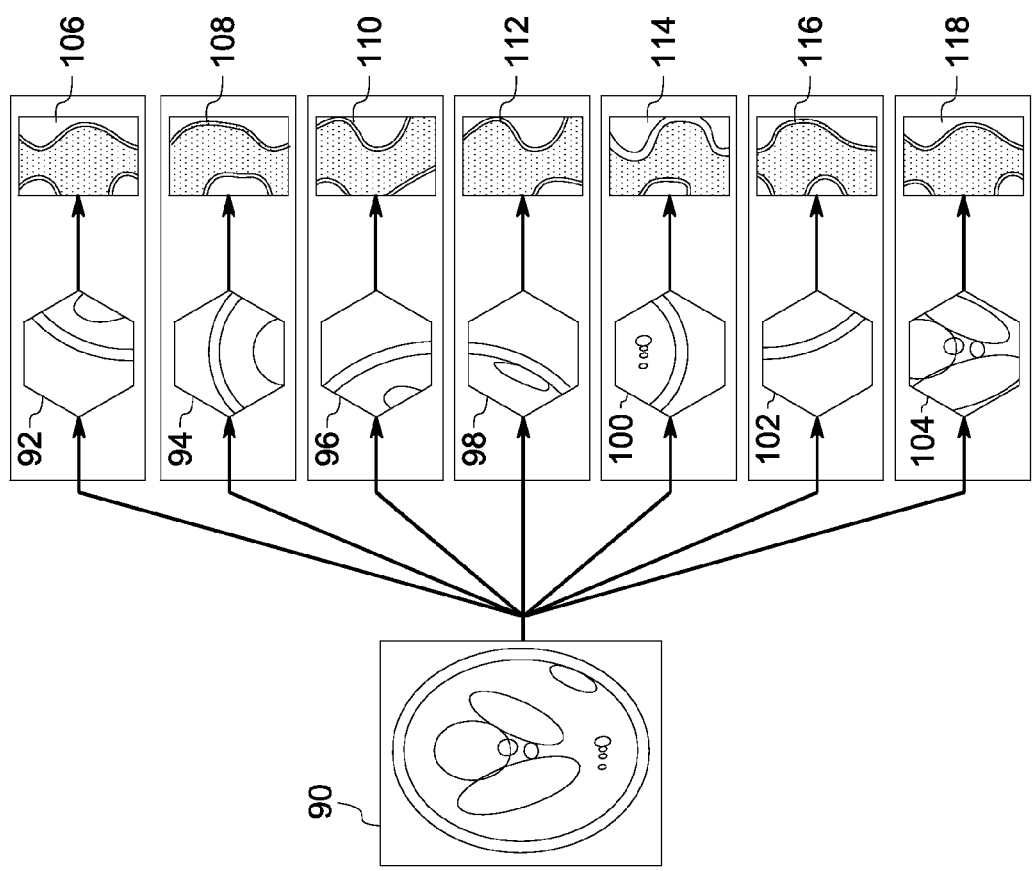
FIG. 5 is a diagram illustrating a process for dividing an image into hexagonal sub-regions according to an embodiment of the invention.

FIG. 4 is a flowchart illustrating, a control scheme 64 for generating an image in accordance with an alternative embodiment. The control scheme 64 comprises two stages 66 and 67. The first stage 66 includes the steps of accessing a data sinogram at step 68, reconstructing the data sinogram to obtain the image at step 70, dividing the image into a plurality of sub-regions at step 72, defining a region of interest by including at least one sub-region at step 74, and reprojecting the complement of the region of interest at step 76. Further, the second stage 67 includes the steps of identifying an estimated representation of the region of interest at step 78, reprojecting the estimated representation of the region of interest at step 80 to obtain a sinogram representative of the estimated region of interest, and at step 82, adding the sinogram representative of estimated region of interest in step 80 with the sinogram representative of the complement of the region of interest resulting from step 76 to obtain a resultant sinogram. The resultant sinogram obtained at step 82 is then compared with the data sinogram in step 68 to calculate a difference sinogram at step 84. A determination is then made as to whether the difference sinogram meets a similarity threshold at step 86. If the similarity threshold is not satisfied in step 86, the image is iteratively updated. The steps 88, 80, 82, 84 and 86 are performed iteratively until the similarity threshold is satisfied at step 86 at which time the control scheme ends. In accordance with one embodiment, the iterative filtered backprojection method may be used to reconstruct the image at step 54 in FIG. 3 and step 70 in FIG. 4. This method may be described as follows:

$$\mu^{n+1} = \mu^n + FBP[y - PROJ(\mu^n)] \quad (1)$$

where:
  $\mu$: is the current estimate of the image
  n: is the index of iteration
  y: is the data sinogram
  FBP: is the filtered backprojection
  PROJ: is the projection performed FIG. 5 illustrates one embodiment of a process for dividing an image into hexagonal sub-regions. In FIG. 5, an image 90 is divided into a series of sub-regions 92, 94, 96, 98, 100, 102, and 104. Each sub-region is preferably equally sized and hexagonal in shape. Moreover, the image 90 is initially divided into seven sub-regions, however, it may be noted that fewer or more than seven sub-regions may be defined. Each sub-region is then shifted to the origin of the coordinate system or the reference origin followed by reprojection to yield a series of partial sinograms 106, 108, 110, 112, 114, 116 and 118, respectively. Shifting of the image sub-regions to the center of the co-ordinate system reduces the azimuthal bandwidth requirements for the corresponding partial sinogram. That is, by shifting the image sub-regions, it is possible to use fewer views, and hence further improve the overall reconstruction speed relative to conventional reprojection techniques. Thereafter, iterative reconstruction may be performed on each of the partial sinograms as described earlier. The images thus obtained may be repositioned to obtain the full image for a region of interest or a region of interest complement.

Figure 6:
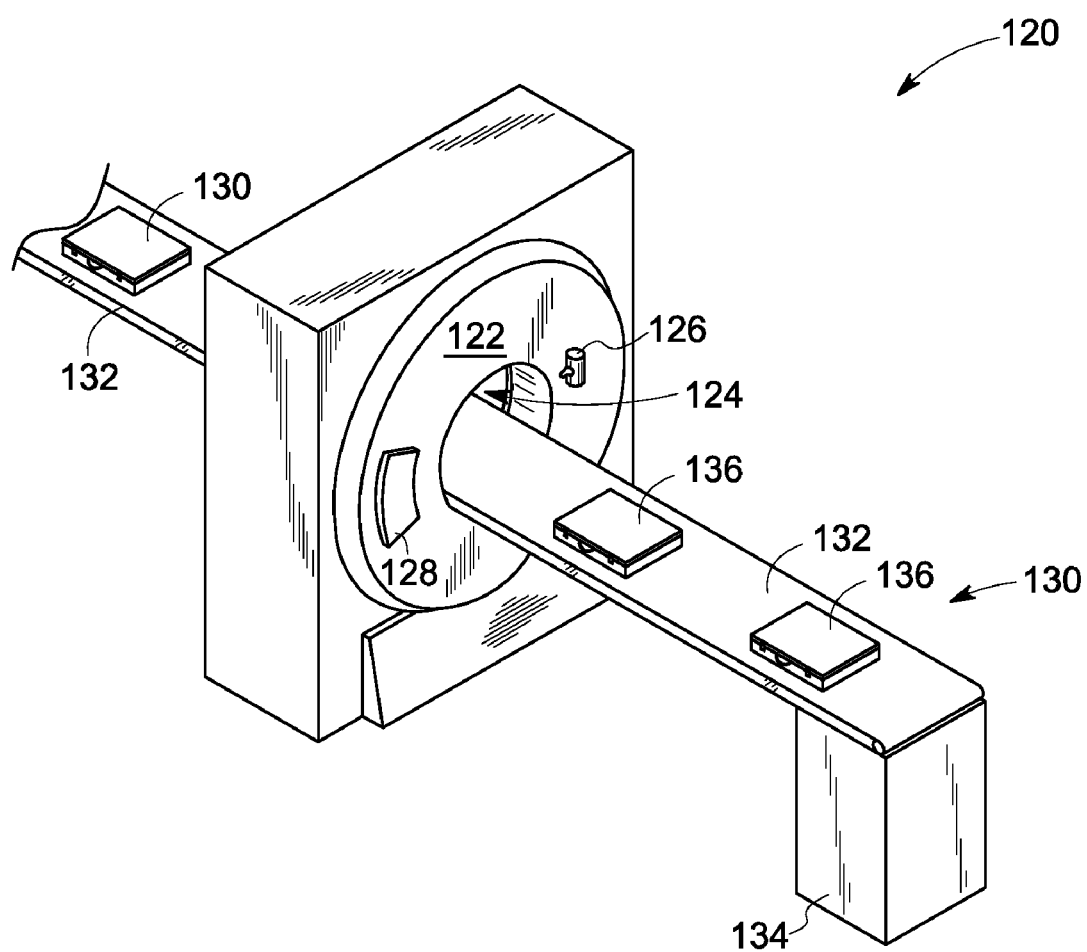
FIG. 6 is a pictorial view of a CT system for use with a non-invasive package/baggage inspection system according to an embodiment of the invention.

FIG. 6 illustrates an exemplary package/baggage inspection system 120 according to another embodiment of the present technique. Although not shown the package/baggage inspection system 120 may include an image reconstruction system similar to that illustrated in FIG. 2. In one embodiment, the inspection system 120 may perform the image processing methods illustrated in FIG. 3 and FIG. 4. Accordingly, image reconstruction speeds of the package/baggage inspection system 120 may be increased. The package/baggage inspection system 120 includes a rotatable gantry 122 having an opening 124 therein through which packages or pieces of baggage may pass. The rotatable gantry 122 houses an x-ray source 126 as well as a detector assembly 128. A conveyor system 130 is also provided and includes a conveyor belt 132 supported by structure 134 to automatically and continuously pass packages or baggage pieces 136 through opening 124 to be scanned. Objects 136 are fed through opening 124 by conveyor belt 132, imaging data is then acquired, and the conveyor belt removes the packages from the opening in a controlled and continuous manner. As a result, postal inspectors, baggage handlers, and other security personnel may non-invasively inspect the contents of packages for explosives, knives, guns, contraband, etc with increased speed and improved image quality.

The above discussed techniques of generating an image employing sinogram separation and targeted reconstruction have many advantages, including fast reconstruction and improved image quality. Further, the techniques perform efficient region of interest reconstruction. Moreover, the technique reduces the computational complexity of iterative reconstruction by using a simplified virtual geometry.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of generating an image comprising:
   accessing a data sinogram representative of the image;
   reconstructing the image;
   dividing the image into a plurality of sub-regions;
   defining a region of interest including at least one sub-region;
   reprojecting the complement of the region of interest to generate a sinogram representative of the complement of the region of interest;
   identifying an estimated representation of the region of interest;
   reprojecting the estimated representation of the region of interest to obtain an estimated sinogram;
   adding the estimated sinogram with the sinogram representative of the complement of the region of interest to obtain a resultant sinogram;
   comparing the resultant sinogram with the data sinogram to determine if a similarity threshold has been satisfied; and iteratively updating the estimated representation of the region of interest if the similarity threshold is not satisfied.

2. The method of claim 1 wherein, reconstructing the image comprises reconstructing the image using filtered backprojection.

3. The method of claim 2, wherein iterations in the filtered backprojection are reduced by applying a boosting kernel.

4. The method of claim 1 wherein, the image is divided into N×M sub-regions.

5. The method of claim 1 wherein, the sub-regions comprise square or hexagonal shaped regions.

6. A tomographic imaging apparatus comprising:
a computer programmed to:
   access a data sinogram representative of the image;
   reconstruct the image;
   divide the image into plurality of sub-regions;
   define a region of interest including at least one sub-region;
   reproject the complement of the region of interest to generate a sinogram representative of the complement of the region of interest;
   identify an estimated representation of the region of interest;
   reproject the estimated representation of the region of interest to obtain an estimated sinogram;
   add the estimated sinogram with the sinogram representative of the complement of the region of interest to obtain a resultant sinogram;
   compare the resultant sinogram with the data sinogram to determine if a similarity threshold has been satisfied; and
   iteratively update the estimated representation of region of interest if the similarity threshold is not satisfied; and
a display for displaying the image.

7. The tomographic imaging apparatus of claim 6, wherein the computer is programmed to divide the image into N×M sub-regions.

8. The tomographic imaging apparatus of claim 6, wherein the computer is further programmed to divide the image into sub-regions comprising square or hexagonal shaped regions.

9. The tomographic imaging apparatus of claim 6, wherein the computer is further programmed to shift the sub-region to a reference origin.

10. A non-transitory computer readable media embodying a computer program, the computer program configured to execute the steps of:
   accessing a data sinogram representative of the image;
   reconstructing the image;
   dividing the image into plurality of sub-regions;
   defining a region of interest including at least one sub-region;
   reprojecting the complement of the region of interest to generate a sinogram representative of the complement of the region of interest;
   identifying an estimated representation of the region of interest;
   reprojecting the estimated representation of the region of interest to obtain an estimated sinogram;
   adding the estimated sinogram with the sinogram representative of the complement of the region of interest to obtain a resultant sinogram;
   comparing the resultant sinogram with the data sinogram to determine if a similarity threshold has been satisfied; and
   iteratively updating the estimated representation of region of interest if the similarity threshold is not satisfied.

11. The non-transitory computer readable media of claim 10, wherein the computer program is further configured to divide the image into N×M sub-regions.

12. The non-transitory computer readable media of claim 10, wherein the computer program is further configured to divide the image into sub-regions comprising square or hexagonal shaped regions.

13. The non-transitory computer readable media of claim 10, wherein the computer program is further configured to shift the sub-region to a reference origin.

* * * * *